(12) United States Patent
Lo et al.

(10) Patent No.: US 10,334,250 B2
(45) Date of Patent: Jun. 25, 2019

(54) METHOD AND APPARATUS FOR SCHEDULING ENCODING OF STREAMING DATA

(71) Applicant: INDUSTRIAL TECHNOLOGY RESEARCH INSTITUTE, Hsinchu (TW)

(72) Inventors: Chi-Wen Lo, Kaohsiung (TW); Hao-Ping Kang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 467 days.

(21) Appl. No.: 14/965,630

(22) Filed: Dec. 10, 2015

(65) Prior Publication Data

US 2017/0134729 A1 May 11, 2017

(30) Foreign Application Priority Data

Nov. 6, 2015 (TW) .............................. 104136679 A

(51) Int. Cl.
*H04N 7/12* (2006.01)
*H04N 19/152* (2014.01)
(Continued)

(52) U.S. Cl.
CPC ......... *H04N 19/152* (2014.11); *H04N 19/127* (2014.11); *H04N 19/139* (2014.11);
(Continued)

(58) Field of Classification Search
CPC .................................................. H04N 19/127
(Continued)

(56) References Cited

U.S. PATENT DOCUMENTS 7,809,061 B1 10/2010 Sarna
2002/0064228 A1 5/2002 Sethuraman et al.
(Continued)

FOREIGN PATENT DOCUMENTS

CN 101454990 A 6/2009
TW 200536310 A 11/2005
(Continued)

OTHER PUBLICATIONS

Chen, Long et al., "Exploring Fine-Grained Task-based Execution on Multi-GPU Systems," IEEE International Conference on Cluster Computing, pp. 386-394, 2011.
(Continued)

*Primary Examiner* — Richard T Torrente
(74) *Attorney, Agent, or Firm* — Birch, Stewart, Kolasch & Birch, LLP

(57) ABSTRACT

A method for scheduling encoding of streaming data by a scheduling apparatus includes: when there is at least one idle hardware encoder and there is no full GOF in any one of the at least one streaming buffer, but there is at least one non-full GOF in any one of the at least one streaming buffer, then, calculating a reception rate of each of the at least one non-full GOF, and starting encoding already-received frames of the one of the at least one non-full GOF with a highest reception rate using one of the at least one idle hardware encoder; and if there is at least one idle hardware encoder and there is at least one full GOF in any one of the at least one streaming buffer, encoding one of the at least one full GOF using one of the at least one idle hardware encoder.

21 Claims, 4 Drawing Sheets

(51) Int. Cl.
*H04N 19/127* (2014.01)
*H04N 19/177* (2014.01)
*H04N 19/436* (2014.01)
*H04N 19/139* (2014.01)
*H04N 19/14* (2014.01)

(52) U.S. Cl.
CPC ........... *H04N 19/14* (2014.11); *H04N 19/177* (2014.11); *H04N 19/436* (2014.11)

(58) Field of Classification Search
USPC .................................................. 375/240.03
See application file for complete search history.

(56) References Cited

U.S. PATENT DOCUMENTS

| | | | |
|---|---|---|---|
| 2003/0048853 | A1 | 3/2003 | Oh et al. |
| 2005/0053131 | A1* | 3/2005 | Domke ............... H04N 19/42 375/240.01 |
| 2007/0201562 | A1 | 8/2007 | Ganesh et al. |
| 2007/0217518 | A1 | 9/2007 | Valmiki et al. |
| 2007/0291040 | A1 | 12/2007 | Bakalash et al. |
| 2009/0016430 | A1 | 1/2009 | Schmit et al. |
| 2010/0053176 | A1 | 3/2010 | Koduri et al. |
| 2010/0135383 | A1 | 6/2010 | Zhao et al. |
| 2011/0305273 | A1* | 12/2011 | He ..................... H04N 19/30 375/240.02 |
| 2012/0243601 | A1 | 9/2012 | Schmit et al. |
| 2014/0286390 | A1 | 9/2014 | Fear |
| 2014/0337835 | A1 | 11/2014 | Johnson |
| 2014/0340410 | A1 | 11/2014 | Wu |

FOREIGN PATENT DOCUMENTS

| | | |
|---|---|---|
| TW | 200607352 A | 2/2006 |
| TW | 200615906 A | 5/2006 |
| TW | 200807328 | 2/2008 |
| TW | 200820083 | 5/2008 |
| TW | 201143336 A1 | 12/2011 |
| TW | 201225656 A1 | 6/2012 |
| TW | 201407482 A | 2/2014 |

OTHER PUBLICATIONS

Elliott, Glenn et al., "GPUSync: A Framework for Real-Time GPU Management," IEEE 34th Real-Time Systems Symposium, pp. 33-44, 2013.

Fechteler, Philipp and Eisert, Peter, "Accelerated Video Encoding Using Render Context Information," IEEE 17th International Conference on Image Processing, pp. 2033-2036, Sep. 26-29, 2010.

Liang, Yun et al., "Efficient GPU Spatial-Temporal Multitasking," IEEE Transactions on Parallel and Distributed Systems, vol. 26, No. 3, pp. 748-760, Mar. 2015.

Momcilovic, Svetislav et al., "Dynamic Load Balancing for Real-Time Video Encoding on Heterogeneous CPU+GPU Systems," IEEE Transactions on Multimedia, vol. 16, No. 1, pp. 108-121, Jan. 2014.

Schwalb, Martin et al., "Fast Motion Estimation on Graphics Hardware for H. 264 Video Encoding," IEEE Transactions on Multimedia, vol. 11, No. 1, pp. 1-10, Jan. 2009.

Tanasic, Ivan et al., "Enabling Preemptive Multiprogramming on GPUs," ACM/IEEE 41st ISCA, pp. 193-204, 2014.

Ukidave, Yash et al., "Runtime Support for Adaptive Spatial Partitioning and Inter-Kernel Communication on GPUs," IEEE 26th International Symposium on Computer Architecture and High Performance Computing, pp. 168-175, 2014.

Zhong, Jianlong and He, Bingsheng, "Kernelet: High-Throughput GPU Kernel Executions with Dynamic Slicing and Scheduling," IEEE Transactions on Parallel and Distributed Systems, vol. 25, No. 6, pp. 1522-1532, Jun. 2014.

* cited by examiner

METHOD AND APPARATUS FOR SCHEDULING ENCODING OF STREAMING DATA

CROSS-REFERENCE TO RELATED APPLICATIONS

This non-provisional application claims priority under 35 U.S.C. § 119(a) on Patent Application No. 104,136,679 filed in Taiwan on Nov. 6, 2015, the entirety of which is incorporated herein by reference.

BACKGROUND OF THE DISCLOSURE

Field of the Disclosure

This disclosure relates to a method and an apparatus for scheduling encoding of streaming data.

Background of the Disclosure

Online audio/video streaming through Internet becomes one of network applications as the advance of network hardware and software technologies. For example, in video/audio service applications, messages such as personalized patterns, watermarks, advertising and other messages could be encoded and added on the video/audio streaming data. Live streaming data could be encoded and converted into data with different resolutions for playing on different broadcasting devices. Streaming data is often required to be encoded first, and the encoded contents are transmitted to the user equipment or the back-end server. In other words, in the network applications, encoding streaming data plays one of important roles for audio/video broadcasting through Internet. It requires a lot of computation.

Nowadays the hardware encoder is widely used to provide high-speed encoding capabilities. For example, a graphics processing chip (Graphics Processing Unit, GPU) is commonly used to encode the live video streaming data. In order to take advantage of the maximum ability of the hardware encoder, the use of hardware sharing technology is adopted. Sharing the hardware encoder resources may allow the hardware encoder to process more coding works. How to efficiently utilize hardware encoder resources becomes an important issue.

SUMMARY

A method for scheduling encoding of streaming data by a scheduling apparatus is provided, which comprises: determining whether there is at least one idle hardware encoder; determining whether there is at least one full group of frames (GOF) in any one of at least one streaming buffer; if there is at least one idle hardware encoder and there is no full GOF in any one of the at least one streaming buffer, but there is at least one non-full GOF in any one of the at least one streaming buffer, then, calculating a reception rate of each of the at least one non-full GOF, and starting encoding already-received frames of the one of the at least one non-full GOF with a highest reception rate using one of the at least one idle hardware encoder; and if there is at least one idle hardware encoder and there is at least one full GOF in any one of the at least one streaming buffer, encoding one of the at least one full GOF using one of the at least one idle hardware encoder.

A scheduling apparatus is provided, which comprises a storage unit, at least one hardware encoder and a scheduling unit. The storage unit storing at least one streaming buffer. The scheduling unit configured to: determine whether there is at least one idle hardware encoder; determine whether there is at least one full (group of frames) GOF in any one of at least one streaming buffer; if there is at least one idle hardware encoder and there is no full GOF in any one of the at least one streaming buffer, but there is at least one non-full GOF in any one of the at least one streaming buffer, then, calculate a reception rate of each of the at least one non-full GOF, and start to encode already-received frames of the one of the at least one non-full GOF with a highest reception rate using one of the at least one idle hardware encoder; and if there is at least one idle hardware encoder and there is at least one full GOF in any one of the at least one streaming buffer, encode one of the at least one full GOF using one of the at least one idle hardware encoder.

A non-transitory computer readable medium containing a computer program product is provided, which comprises computer-executable instructions causing a processor to perform the method above after the computer-executable instructions are loaded on a computer and are executed.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure, and wherein.

DESCRIPTION OF THE EMBODIMENTS

Figure 1:
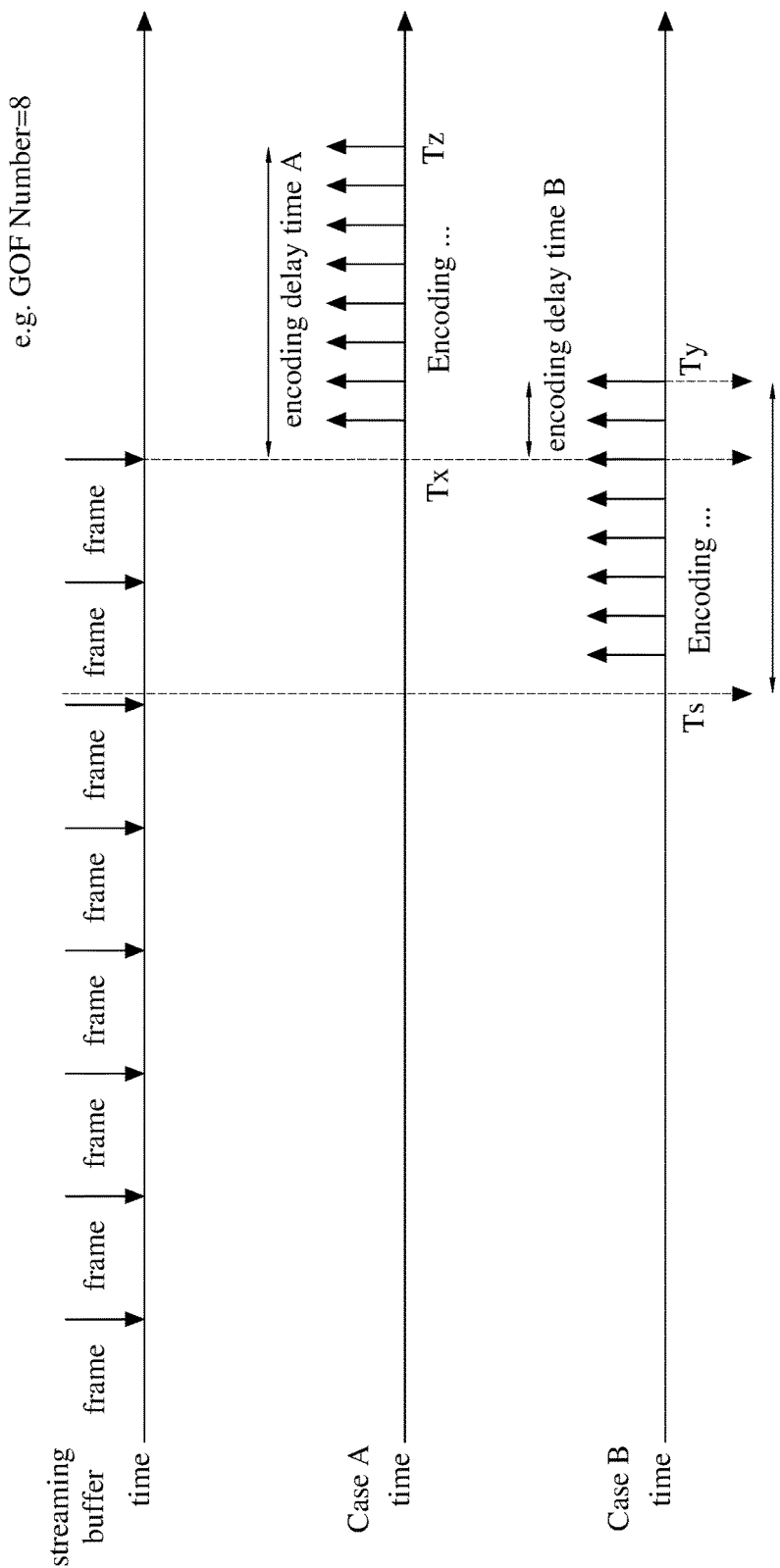
FIG. 1 shows different encoding delay times for different scheduling schemes.

The present disclosure will now be described in detail with reference to the accompanying drawings, wherein the same reference numerals will be used to identify the same or similar elements throughout the several views. It should be noted that the drawings should be viewed in the direction of orientation of the reference numerals.

In exemplary embodiments, there are provided methods and apparatuses for scheduling encoding of streaming data. The streaming data includes frames.

FIG. 1 shows different encoding delay times for different scheduling schemes. In FIG. 1, taking one streaming buffer and one encoder as an example, the streaming buffer carries frames from a streaming source (for example, a video recorder), and a full group of frames (GOF) includes 8 frames. Case A shows a schedule scheme that the encoder starts to encode only when there are a full GOF (e.g., 8 frames in this example) in the streaming buffer. In Case A, once all 8 frames are received in the streaming buffer at time $T_x$, the encoder starts to encode at time $T_x$, and the encoder completes the encoding task at time $T_z$. Case B shows a schedule scheme that the encoder starts to encode as long as there are at least one frame received, even when the streaming buffer does not have a full GOF. In Case B, although there are only 6 frames in the streaming buffer at time $T_s$, the encoder starts to encode at $T_s$, and complete the encoding task of all 8 frames at time $T_y$. As shown in FIG. 1, the encoding delay time A in Case A is longer than the encoding delay time B in Case B. In other words, the schedule scheme in Case B is more efficient than the schedule scheme in Case A, because instead of keeping idle the encoder starts encoding for a time period of $(T_x-T_s)$ earlier in Case B than in Case A.

Therefore, if an idle encoder can start encoding frames in the streaming buffer before all of the frames in a full GOF are received, the encoding efficiency can be improved and the encoding delay time can be significantly reduced.

In view of the above, embodiments of a method and an apparatus for scheduling encoding of streaming data with a better encoding efficiency are provided.

Figure 2:
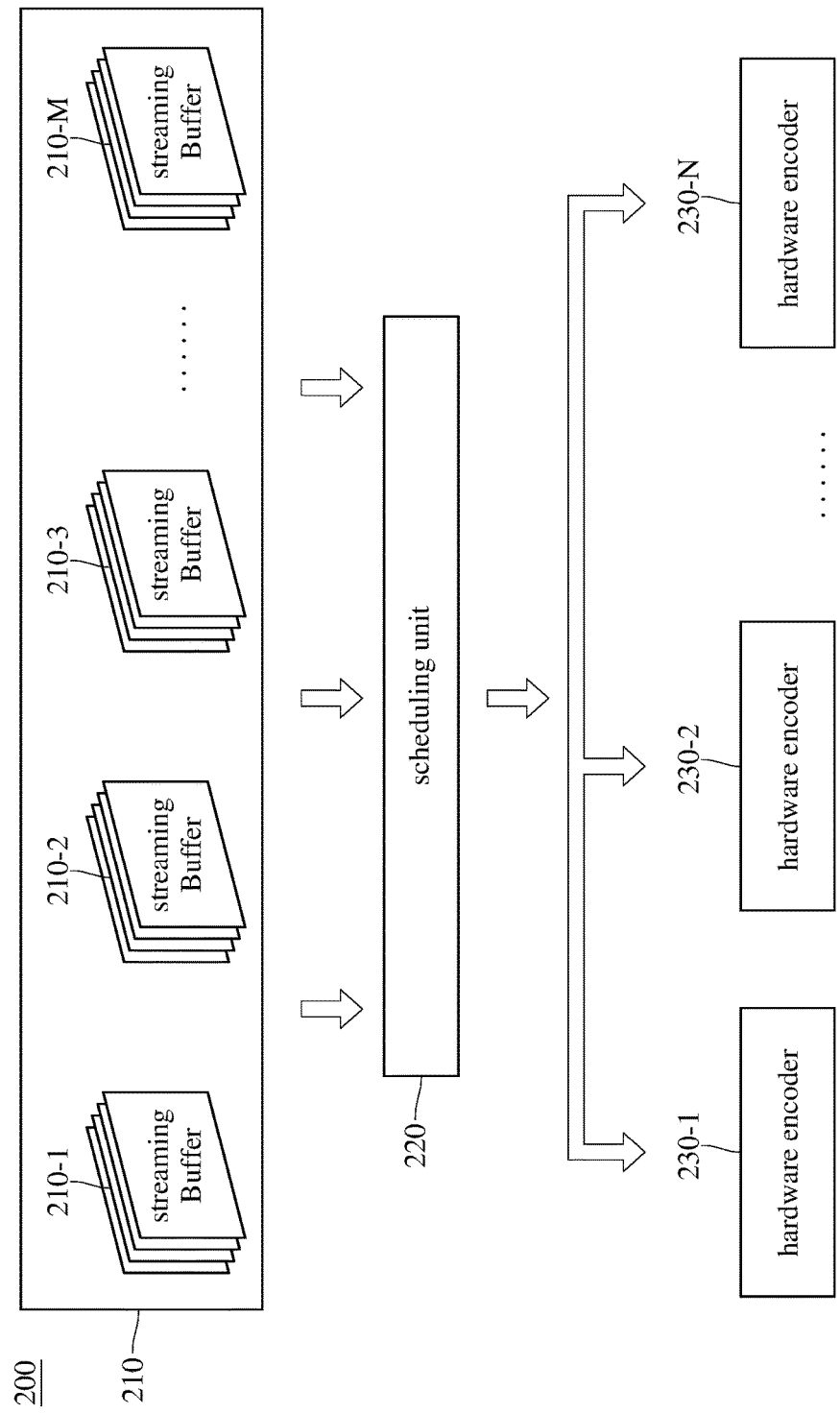
FIG. 2 shows a block diagram of a scheduling apparatus for scheduling encoding of streaming data, according to an exemplary embodiment.

FIG. 2 illustrates a block diagram of a scheduling apparatus 200 for scheduling the encoding of streaming frames in an embodiment.

According to an exemplary embodiment shown in FIG. 2, the scheduling apparatus 200 comprises a storage unit 210 storing the at least one streaming buffer 210-1, 210-2, 210-3, . . . 210-M, a scheduling unit 220 and at least one hardware encoder 230-1, 230-2, . . . 230-N. Wherein M, N are positive integer.

Figure 3A:
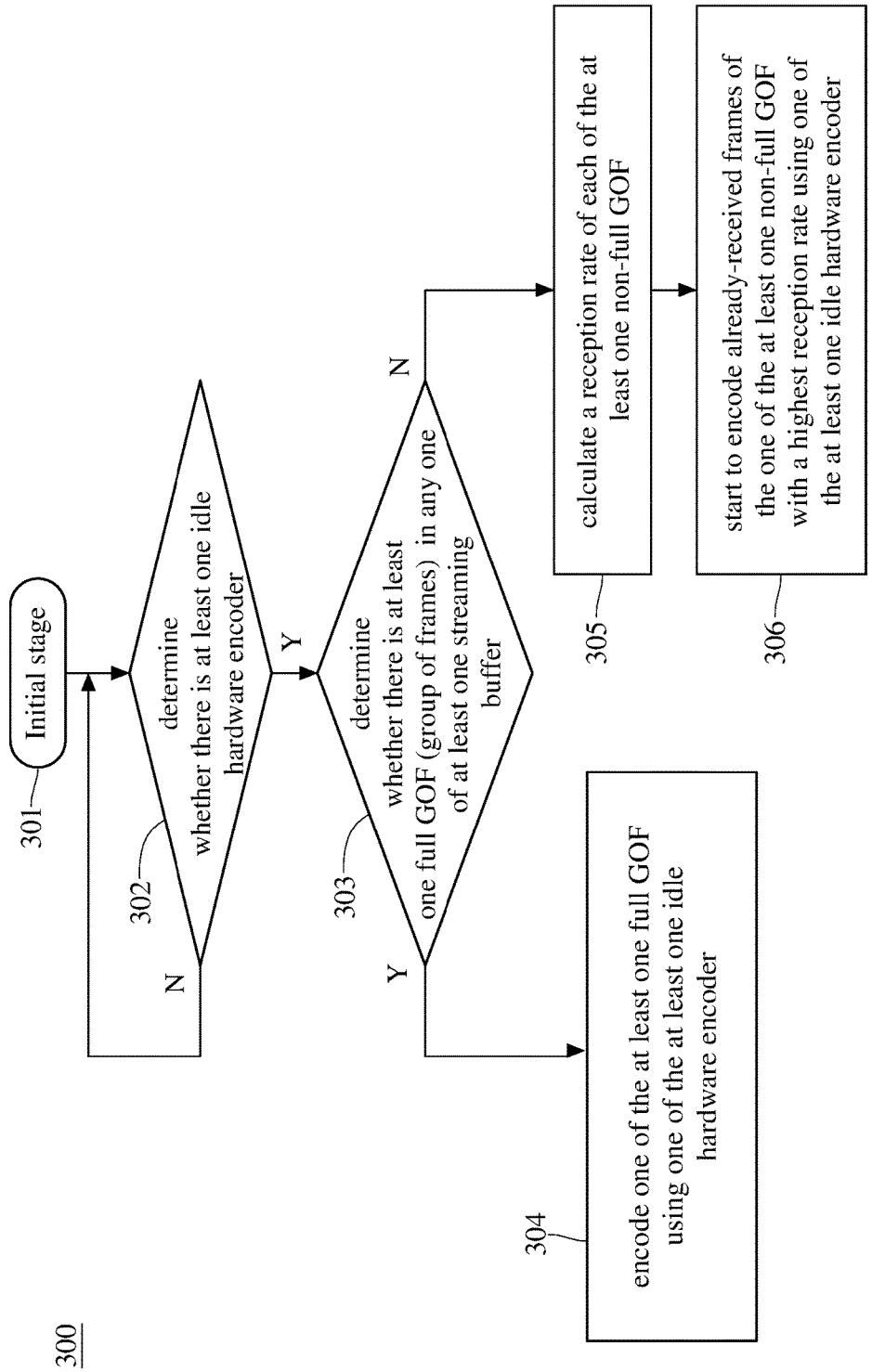
FIG. 3A shows a method of scheduling encoding of streaming data according to an exemplary embodiment.

As shown in FIG. 3A, in an embodiment, the scheduling unit 220 is configured to: determine whether there is at least one idle hardware encoder (step 302); determine whether there is at least one full GOF in any one of at least one streaming buffer (step 303); if there is at least one idle hardware encoder and there is no full GOF in any one of the at least one streaming buffer, but there is at least one non-full GOF in any one of the at least one streaming buffer, then calculate a reception rate of each of the at least one non-full GOF (step 305), and starts to encode already-received frames of the one of the at least one non-full GOF with a highest reception rate using one of the at least one idle hardware encoder (step 306); if there is at least one idle hardware encoder and there is at least one full GOF in any one of the at least one streaming buffer, encode one of the at least one full GOF using one of the at least one idle hardware encoder (step 304).

In step 304, in an embodiment, if there are more than one full GOF in any one of the at least one streaming buffer, the scheduling unit 220 encodes the full GOFs based a first-in-first-out (FIFO) algorithm, and the first-in time is determined based on when the full GOP is received. In step 302, if there is no idle hardware encoder, the scheduling unit 220 continues to determine whether there is at least one idle hardware encoder. In other embodiments, the scheduling unit 220 wait for a notice indicating there is at least one idle hardware encoder, or using other implementations, but not limited to.

In an embodiment, an idle hardware encoder means that this hardware encoder is not responsible for encoding in the meantime.

In an embodiment, the streaming buffers 210-1, 210-2, 210-3, . . . 210-M carry the frames from at least one streaming source. In some embodiments, the at least one streaming source may be, but not limited to, a video recorder, an audio recorder, etc. In some embodiments, the at least one hardware encoder may be a GPU, a voice processing unit, or other encoders. In some embodiments, the storage unit 210 may be, but not limited to, a memory device or a plurality of memory devices. In some embodiments, each of the at least one streaming buffer has its corresponding GOF number based on its corresponding streaming source, and each GOF number is pre-determined. The streaming buffer has at least one full GOF means that the number of frames in the streaming buffer is more than or equal to the GOF number. The streaming buffer has at least one non-full GOF means that the number of frames in the streaming buffer is larger than 0 but less than the GOF number. For example, when the GOF number of one streaming buffer is 8, and the same streaming buffer currently has 8 or more than 8 frames therein, then the streaming buffer has at least one full GOF. If, however, the streaming buffer currently has less than 8 frames therein, then the streaming buffer has no full GOF and the streaming buffer has a non-full GOF. In an embodiment, the GOF numbers of all streaming buffers are the same. In some embodiments, some or all of the GOF numbers of the streaming buffers are different.

As shown in step 304, if there is at least one idle hardware encoder and there is at least one full GOF in any one of the at least one streaming buffer, the scheduling unit 220 encodes one of the at least one full GOF using one of the at least one idle hardware encoder.

Using three (3) streaming buffers 210-1, 210-2, 210-3 as an example, in which the GOF numbers for the streaming buffers 210-1, 210-2, 210-3 are 8, 8, 10, if there are 9 frames in the streaming buffer 210-1, 6 frames in the streaming buffer 210-2, and 9 frames in the streaming buffer 210-3, it means that the streaming buffer 210-1 has at least one full GOF, the streaming buffer 210-2 has no full GOF, and the streaming buffer 210-3 has no full GOF.

If there is one idle hardware encoder available, the scheduling unit 220 reads 8 frames (i.e., a full GOF) from the streaming buffer 210-1 for encoding according to step 304.

If, however, there is at least one idle hardware encoder and there is no full GOF in any one of the at least one streaming buffer, but there is at least one non-full GOF in any one of the at least one streaming buffer, then, the scheduling unit 220 calculates a reception rate of each of the at least one non-full GOF (step 305), and, start to encode already-received frames of the one of the at least one non-full GOF with a highest reception rate using one of the at least one idle hardware encoder (step 306).

For example, if the already-received frames in the streaming buffer 210-1 are 6 frames (less than the GOF number (8) of the streaming buffer 210-1), the already-received frames in the streaming buffer 210-2 are 4 frames (less than the GOF number (8) of the streaming buffer 210-2) and the already-received frames in streaming buffer 210-3 is 5 frames (less than the GOF number (10) of the streaming buffer 210-3), this means that there is no full GOF in any one of the streaming buffers 210-1, 210-2 and 210-3. Therefore, the scheduling unit 220 calculates reception rate 1, reception rate 2 and reception rate 3 for the streaming buffer 210-1, 210-2 and 210-3, respectively.

For example, if reception rate 1 is the highest among reception rate 1, reception rate 2 and reception rate 3, the scheduling unit 220 starts to read the already-received frames (6 frames in the aforementioned example) from the streaming buffer 210-1, and uses one of the at least one idle hardware encoder to encode the frames sequentially. In addition, since streaming buffer 210-1 just wait 2 rest of the frames of a non-full GOP and then achieves a full GOF. In contrast, the streaming buffer 210-2 and streaming buffer 210-3 should wait 4 and 5 frames, respectively, to achieve the full GOFs. Hence, the idle encoder selects streaming 210-1 can reduce the waiting time and the encoding delay time can be significantly reduced.

Figure 3B:
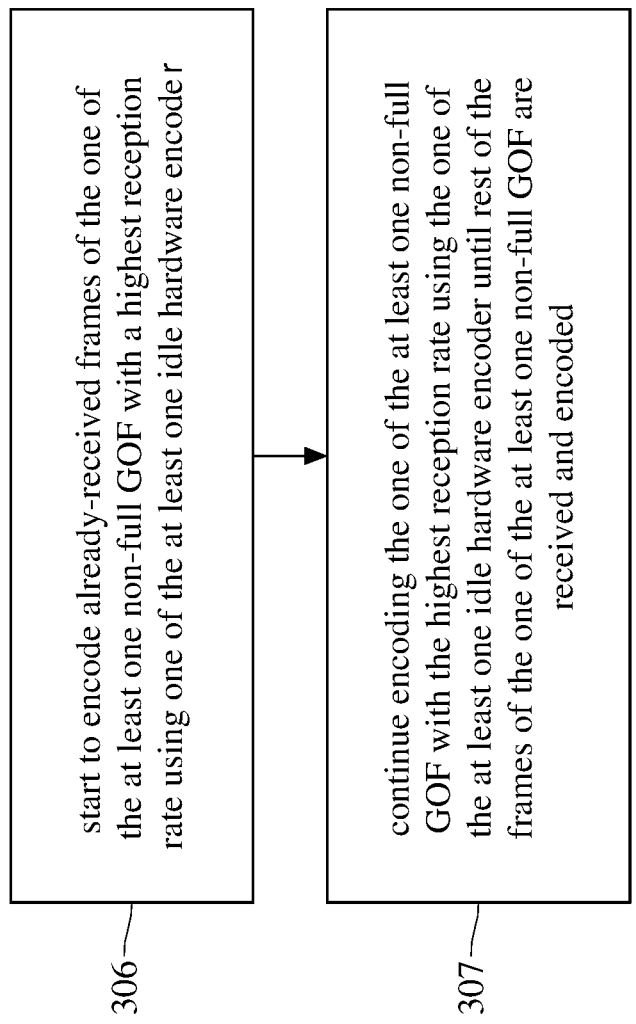
FIG. 3B shows a method of scheduling encoding of streaming data according to another exemplary embodiment.

As shown in FIG. 3B, in an embodiment, the scheduling unit 220 is further configured to, after starting to encode the already-received frames of the one of the at least one non-full GOF with the highest reception rate using the one of the at least one idle hardware encoder, continue encoding the one of the at least one non-full GOF with the highest reception rate using the one of the at least one idle hardware encoder until rest of the frames of the one of the at least one non-full GOF are received and encoded (step 307), and the already-received frames of the one of the at least one non-full GOF and the rest of the frames of the one of the at least one non-full GOF constitute one full GOF of the one of the at least one non-full GOF. Use case B in FIG. 1 as an example, the GOF number of the steaming buffer is 8. At time $T_x$, after encoding the already-received 6 frames, the encoder continues to encode the frames in the streaming buffer until the rest 2 frames are received and encoded. The already-received frames (6 frames) and the rest of the frames (2 frames) constitute one full GOF (8 frames).

In this example, after reading and encoding the already-received 6 frames from the streaming buffer 210-1, the scheduling unit 220 continues to read and encode frames from the streaming buffer 210-1 until rest of the frames (i.e., 2 frames) in the full GOF (i.e., 8 frames) are received and encoded.

In one embodiment, a hardware encoder becomes in a busy state when it starts to encode. In one embodiment, the hardware encoder becomes in an idle state after a full GOF of the corresponding streaming buffer are encoded.

In an embodiment, the one of the at least one idle hardware encoder does not encode any other full GOF or non-full GOF until rest of the frames of the one of the at least one non-full GOF are received and encoded, and the already-received frames of the one of the at least one non-full GOF and the rest of the frames of the one of the at least one non-full GOF constitute full frames of the one of the at least one non-full GOF. Therefore, when the idle hardware encoder starts to encode the already-received frames of a GOF from a particular streaming buffer, it will not encode the frames from another GOF from any streaming buffers until the rest frames in the GOF are encoded.

For example, after reading and encoding the already-received 6 frames from the streaming buffer 210-1, the hardware encoder will not encode the frames from another GOF from any streaming buffers until rest of the frames (i.e., 2 frames) in the full GOF (i.e., 8 frames) are received and encoded.

In one embodiment, the reception rate of each of the at least one non-full GOF is proportional to the resolution rate of each of the at least one non-full GOF.

The resolution rate is determined based on the resolution of the frames in each streaming buffer. In some embodiments, the resolution rate is determined at the initial step (step 301, FIG. 3A) or at the step of calculating the reception rate (step 305, FIG. 3A).

In some embodiment, the resolution rate is determined by, but not limited to, Area Ratio method, Exhaustion method, Classification method, Interpolation method, etc.

Here, video frames are used as an example for illustration. The resolution (W×H) of the video frames in the streaming buffers may be, for example, (1920×1080), (1024×768), (800×600), etc.

When using the Area Ratio method, for example, the resolution 1920×1080 can be used as a base resolution, and the resolution rate of the frames in the streaming buffer is: (W×H)/(1920×1080).

When using the Exhaustion method, the encoding time for frames with known resolutions (e.g. 1920×1080, 1024×768, 800×600, etc) is pre-measured. For example, the encoding time for a frame with the resolution 1920×1080 can be used as a base, and the resolution rate of the frames in the streaming buffer is: (encoding time for (W×H))/(encoding time for (1920×1080)).

When using the Classification method, the encoding time for frames with known resolutions (e.g. 1920×1080, 1024×768, 800×600, etc) is pre-measured, and the resolution of the frames in each streaming buffer is classified into one of the known resolution groups if its resolution is closest to the resolution of one of the known groups. For example, the encoding time for a frame with the resolution 1920×1080 can be used as a base, and if the resolution (W×H)(e.g., 1000×750) of the frames in a streaming buffer is closest to one of the known groups (1024×768), it is classified into this group, and the resolution rate of the frames in the streaming buffer is (encoding time for (1024×768))/(encoding time for (1920×1080)).

When using the Interpolation method, the encoding time for frames known resolutions (e.g. 1920×1080, 1024×768, 800×600, etc) is pre-measured. The encoding time for (W×H) is calculated according to the Interpolation method of its area with the areas of the known resolutions. For example, the encoding time for a frame with the resolution 1920×1080 can be used as a base, and the resolution rate of the frames in the streaming buffer is: (interpolated encoding time for (W×H))/(encoding time for (1920×1080).

In an embodiment, the reception rate of each of the at least one non-full GOF is proportional to a total number of full frames of each of the at least one non-full GOF. The total number of full frames means the GOF number of the corresponding streaming buffer.

In an embodiment, the reception rate of each of the at least one non-full GOF is proportional to a complexity of each of the at least one non-full GOF, and the complexity is pre-calculated according to at least one of Motion Vector Variance, DCT Coefficient Variance, or resolution of each of the at least one non-full GOF. In one embodiment, the complexity of the frames in a corresponding steaming buffer is calculated at an initial step (step 301, FIG. 3A) or before the initial step. In an embodiment, the Motion Vector Variance and the DCT Coefficient variance are calculated according to the historic streaming data in the corresponding streaming buffer. The complexity of a GOF can be represented by other methods, not limited by the disclosed ones.

In an embodiment, the reception rate of each of the at least one non-full GOF is inversely proportional to a time period to receive the rest of the frames of each of the at least one non-full GOF, and the already-received frames of each of the at least one non-full GOF and the rest of the frames of each of the at least one non-full GOF constitute full frames of each of the at least one non-full GOF.

For example, if the GOF number of the stream buffer 210-1 is 8 (i.e., a full GOF has 8 frames), and the already-received frames in the streaming buffer 210-1 are 6 frames, it means that the rest frames to be received in order to be a full GOF are 2 frames. The time period to receive the rest 2 frames in the streaming buffer 210-1, for example, is (2 frames)/(frame rate of the streaming buffer 210-1), and the reception rate is inversely proportional to the time period. In an embodiment, the frame rate of a streaming buffer is the number of streaming frames in one second.

In an embodiment, the reception rate of a streaming buffer is: (GOF Number·Resolution Rate)/(Rest Frame Number/Frame Rate)

In another embodiment, the reception rate of a streaming buffer is: (GOF Number·Resolution Rate·Complexity)/(Rest Frame Number/Frame Rate)

In an embodiment, there is one hardware encoder in the scheduling apparatus. In another embodiment, there are more than one hardware encoder in the scheduling apparatus.

In step 304 and step 306 of FIG. 3A, when there are more than one idle hardware encoder available, one of the idle hardware encoders is selected based on an encoding efficiency thereof.

In an embodiment, the encoding efficiency of the hardware encoders is pre-determined or determined at the initial step (step 301, FIG. 3A).

In an embodiment, for the step 306 of FIG. 3A, when there are a plurality of non-full GOFs, and there are a plurality of idle hardware encoders, the scheduling unit 220 is configured to start encoding already-received frames of one of the plurality of non-full GOFs with the highest reception rate using one of the plurality of idle hardware encoders with a highest encoding efficiency, and start encoding already-received frames of one of the plurality of non-full GOFs with a second highest reception rate using one of the plurality of idle hardware encoders with a second highest encoding efficiency.

In an embodiment, the encoding efficiency is, for example, the encoding speed of the hardware encoder, hardware structure, data access rate, the number of processing unit in encoders, etc.

In an embodiment, the scheduling apparatus further includes at least one queue. The scheduling unit 220 reads frames from the at least one streaming buffer and saves the frames into the at least one queue, and the one of the at least one hardware encoder read frames from the queue directly. In an embodiment, the scheduling unit 220 transmits the frames to one of the at least one hardware encoder 230-1, 230-2 . . . 230-N.

In an embodiment, the scheduling unit 220 includes at least one configured processor. The at least one configured processor is used to implement the functions of the scheduling unit 220.

In an embodiment, the scheduling unit 220 includes at least an integrated circuit.

Any of the disclosed embodiments of the scheduling unit 220 may be implemented on a chip. Specifically, any embodiment may be implemented by using a hardware description language (such as Verilog or VHDL) for circuit design, including circuit integration and layout. A circuit may be designed utilizing the hardware description language in numerous manners. For example, the manufacturer of integrated circuits may realize implementations with application-specific integrated circuits (ASIC) or customer-design integrated circuits.

In embodiments, a non-transitory computer readable medium contains a computer program product comprising computer-executable instructions causing a processor to perform the method according to embodiments described above after the computer-executable instructions are loaded on a computer and are executed. One skilled in the art will appreciate that these aspects can also be stored in or read from other types of tangible, non-transitory computer-readable media, such as secondary storage devices like hard disks, floppy disks, or CD-ROMs, or other forms of RAM or ROM.

Further, the steps of the disclosed methods may be modified in various ways, including by reordering steps and/or inserting or deleting steps, without departing from the principles of the present disclosure.

Implementations of the various processes and features described herein may be embodied in a variety of different equipment or applications, particularly, for example, equipment or applications associated with data encoding.

It will be apparent to those skilled in the art that various modifications and variations can be made to the disclosed embodiments. It is intended that the specification and examples be considered as exemplary only, with a true scope and spirit of the disclosure being indicated by the following claims.

What is claimed is:

1. A method for scheduling encoding of streaming data by a scheduling apparatus, comprising:
   determining whether there is at least one idle hardware encoder;
   determining whether there is at least one full group of frames (GOF) in any one of a plurality of streaming buffers;
   if there is at least one idle hardware encoder and there is no full GOF in any one of the plurality of streaming buffers, but there is at least one non-full GOF in any one of the plurality of streaming buffers, then,
      calculating a reception rate of each of the at least one non-full GOF, wherein the reception rate is a ratio of the number of received frames and the number of the full group of frames; and;
      starting encoding already-received frames of the one of the at least one non-full GOF with a highest reception rate using one of the at least one idle hardware encoder; and
   if there is at least one idle hardware encoder and there is at least one full GOF in any one of the plurality of streaming buffers, encoding one of the at least one full GOF using one of the at least one idle hardware encoder.

2. The method according to claim 1, wherein after starting encoding the already-received frames of the one of the at least one non-full GOF with the highest reception rate using the one of the at least one idle hardware encoder, continuing encoding the one of the at least one non-full GOF with the highest reception rate using the one of the at least one idle hardware encoder until rest of the frames of the one of the at least one non-full GOF are received and encoded, and the already-received frames of the one of the at least one non-full GOF and the rest of the frames of the one of the at least one non-full GOF constitute full frames of the one of the at least one non-full GOF.

3. The method according to claim 1, wherein, the one of the at least one idle hardware encoder does not encode any other full GOF or non-full GOF until rest of the frames of the one of the at least one non-full GOF are received and encoded, and the already-received frames of the one of the at least one non-full GOF and the rest of the frames of the one of the at least one non-full GOF constitute full frames of the one of the at least one non-full GOF.

4. The method according to claim 1, wherein, the reception rate of each of the at least one non-full GOF is proportional to a resolution rate of each of the at least one non-full GOF.

5. The method according to claim 1, wherein the reception rate of each of the at least one non-full GOF is proportional to a total number of full frames of each of the at least one non-full GOF.

6. The method according to claim 1, wherein:
the reception rate of each of the at least one non-full GOF is proportional to a complexity of each of the at least one non-full GOF; and
the complexity is pre-calculated according to at least one of a motion vector variance, DCT Coefficient variance, or resolution of each of the at least one non-full GOF.

7. The method according to claim 1, wherein the reception rate of each of the at least one non-full GOF is inversely proportional to a time period to receive rest of the frames of each of the at least one non-full GOF, and the already-received frames of each of the at least one non-full GOF and the rest of the frames of each of the at least one non-full GOF constitute full frames of each of the at least one non-full GOF.

8. The method according to claim 1, wherein the one of the at least one idle hardware encoder is selected based on an encoding efficiency thereof.

9. The method according to claim 8, wherein the at least one non-full GOF includes a plurality of non-full GOFs, the at least one idle hardware encoder includes a plurality of idle hardware encoders, and the step of starting encoding already-received frames of the one of the at least one non-full GOF with the highest reception rate using one of the at least one idle hardware encoder includes:
starting encoding already-received frames of one of the plurality of non-full GOFs with the highest reception rate using one of the plurality of idle hardware encoders with a highest encoding efficiency, and
starting encoding already-received frames of one of the plurality of non-full GOFs with a second highest reception rate using one of the plurality of idle hardware encoders with a second highest encoding efficiency.

10. A scheduling apparatus, comprising:
a storage unit, storing a plurality of streaming buffers;
at least one hardware encoder; and
a scheduling unit configured to:
determine whether there is at least one idle hardware encoder;
determine whether there is at least one full (group of frames) GOF in any one of the plurality of streaming buffers;
if there is at least one idle hardware encoder and there is no full GOF in any one of the plurality of streaming buffers, but there is at least one non-full GOF in any one of the plurality of streaming buffers, then, calculate a reception rate of each of the at least one non-full GOF, wherein the reception rate is a ratio of the number of received frames and the number of the full group of frames; and;
start to encode already-received frames of the one of the at least one non-full GOF with a highest reception rate using one of the at least one idle hardware encoder; and
if there is at least one idle hardware encoder and there is at least one full GOF in any one of the plurality of streaming buffers, encode one of the at least one full GOF using one of the at least one idle hardware encoder.

11. The scheduling apparatus according to claim 10, wherein the scheduling unit, is further configured to, after starting encoding the already-received frames of the one of the at least one non-full GOF with the highest reception rate using the one of the at least one idle hardware encoder, continue encoding the one of the at least one non-full GOF with the highest reception rate using the one of the at least one idle hardware encoder until rest of the frames of the one of the at least one non-full GOF are received and encoded, and the already-received frames of the one of the at least one non-full GOF and the rest of the frames of the one of the at least one non-full GOF constitute full frames of the one of the at least one non-full GOF.

12. The scheduling apparatus according to claim 10, wherein the one of the at least one idle hardware encoder does not encode any other full GOF or non-full GOF until rest of the frames of the one of the at least one non-full GOF are received and encoded, and the already-received frames of the one of the at least one non-full GOF and the rest of the frames of the one of the at least one non-full GOF constitute full frames of the one of the at least one non-full GOF.

13. The scheduling apparatus according to claim 10, wherein the reception rate of each of the at least one non-full GOF is proportional to a resolution rate of each of the at least one non-full GOF.

14. The scheduling apparatus according to claim 10, wherein the reception rate of each of the at least one non-full GOF is proportional to a total number of full frames of each of the at least one non-full GOF.

15. The scheduling apparatus according to claim 10, wherein the reception rate of each of the at least one non-full GOF is proportional to a complexity of each of the at least one non-full GOF, and the complexity is pre-calculated according to at least one of a motion vector variance, DCT Coefficient variance, or resolution of each of the at least one non-full GOF.

16. The scheduling apparatus according to claim 10, wherein the reception rate of each of the at least one non-full GOF is inversely proportional to a time period to receive rest of the frames of each of the at least one non-full GOF, and the already-received frames of each of the at least one non-full GOF and the rest of the frames of each of the at least one non-full GOF constitute full frames of each of the at least one non-full GOF.

17. The scheduling apparatus according to claim 10, wherein the one of the at least one idle hardware encoder is selected based on an encoding efficiency thereof.

18. The scheduling apparatus according to claim 17, wherein the at least one non-full GOF includes a plurality of non-full GOFs, the at least one idle hardware encoder includes a plurality of idle hardware encoders, and the scheduling unit that is configured to start encoding already-received frames of the one of the at least one non-full GOF with the highest reception rate using one of the at least one idle hardware encoder is further configured to:
start encoding already-received frames of one of the plurality of non-full GOFs with the highest reception rate using one of the plurality of idle hardware encoders with a highest encoding efficiency, and start encoding already-received frames of one of the plurality of non-full GOFs with a second highest reception rate using one of the plurality of idle hardware encoders with a second highest encoding efficiency.

19. The scheduling apparatus according to claim 10, wherein the scheduling unit includes at least one configured processor.

20. The scheduling apparatus according to claim 10, wherein the scheduling unit includes at least an integrated circuit.

21. A non-transitory computer readable medium containing a computer program product comprising computer-executable instructions causing a processor to perform the method according to claim 1 after the computer-executable instructions are loaded on a computer and are executed.

* * * * *